(12) United States Patent
Secord et al.

(10) Patent No.: US 9,092,956 B2
(45) Date of Patent: Jul. 28, 2015

(54) MULTI-FUNCTION EMERGENCY LOCATING AND SENSOR/DETECTION OR WARNING ASSEMBLY SUCH AS ATTACHABLE TO A HELMET OR CLOTHING

(71) Applicants: Tyrone Secord, Rochester Hills, MI (US); Keith Stubl, Clarkston, MI (US)

(72) Inventors: Tyrone Secord, Rochester Hills, MI (US); Keith Stubl, Clarkston, MI (US)

( * ) Notice: Subject to any disclaimer, the term of this patent is extended or adjusted under 35 U.S.C. 154(b) by 68 days.

(21) Appl. No.: 13/726,715

(22) Filed: Dec. 26, 2012

(65) Prior Publication Data
US 2014/0062660 A1    Mar. 6, 2014

Related U.S. Application Data

(60) Provisional application No. 61/580,758, filed on Dec. 28, 2011.

(51) Int. Cl.
G08B 5/00      (2006.01)
G01S 5/16      (2006.01)

(52) U.S. Cl.
CPC .. G08B 5/002 (2013.01); G01S 5/16 (2013.01)

(58) Field of Classification Search
USPC .............. 340/5.3, 539.11, 6.1; 362/106
See application file for complete search history.

(56) References Cited

U.S. PATENT DOCUMENTS

| | | | |
|---|---|---|---|
| 4,554,544 A * | 11/1985 | Task | 340/953 |
| 5,225,828 A | 7/1993 | Walleston | |
| 5,235,337 A | 8/1993 | Clark et al. | |
| 5,490,050 A | 2/1996 | Clark et al. | |
| 5,710,989 A | 1/1998 | Flood | |
| 5,810,467 A * | 9/1998 | Hurwitz | 362/106 |
| 5,915,539 A * | 6/1999 | Lack | 2/422 |
| 6,461,015 B1 * | 10/2002 | Welch | 362/103 |
| 6,805,467 B2 | 10/2004 | Wolf | |
| 6,852,934 B1 * | 2/2005 | Lashua | 200/5 R |
| 6,979,098 B2 | 12/2005 | Petzl et al. | |
| 7,128,434 B1 | 10/2006 | Nally et al. | |
| 7,264,368 B2 * | 9/2007 | Sherring | 362/105 |
| 7,301,453 B2 | 11/2007 | Fry | |
| 7,435,148 B2 | 10/2008 | Clark | |
| 7,787,240 B2 | 8/2010 | Swain | |
| 8,117,676 B1 * | 2/2012 | Cardoso | 2/410 |

(Continued)

OTHER PUBLICATIONS

Website printout titled S&S Precision Manta Strobe (S&S Precision Manta Strobe Tactical Night Vision Company, htts;//tnvc.com/shop/ss-precision-manta-strobe/) printed on Dec. 19, 2012 at 11:18am (2 pages).

(Continued)

*Primary Examiner* — Jennifer Mehmood
*Assistant Examiner* — Omar Casillashernandez
(74) *Attorney, Agent, or Firm* — Gifford, Krass, Sprinkle, Anderson & Citkowski, P.C.; Douglas J. McEvoy

(57) ABSTRACT

A wearable locating and/or recovery assembly having a body containing a portable battery, an on/off switch communicating the battery with a processor control, and at least one additional switch for actuating, selectively or in combination, at least one overt light and at least one infrared light arranged at discrete locations upon the body. The body exhibits a raised and arcuate central battery supporting portion and first and second opposite extending and tapered wings. An over molded underside gripping surface is applied to facilitate mounting the body upon a hard non-linear surface not limited to a helmet.

8 Claims, 18 Drawing Sheets

(56) References Cited

U.S. PATENT DOCUMENTS

| | | |
|---|---|---|
| 2005/0122914 A1* | 6/2005 | Durso et al. .................. 370/270 |
| 2006/0125623 A1* | 6/2006 | Appelt et al. ................. 340/521 |
| 2008/0174484 A1 | 7/2008 | Katz |
| 2009/0047850 A1* | 2/2009 | Russell et al. .................. 441/89 |
| 2009/0209227 A1 | 8/2009 | Greer et al. |
| 2010/0128470 A1 | 5/2010 | Swan et al. |
| 2010/0238682 A1 | 9/2010 | Carpenter |

OTHER PUBLICATIONS

Website printout from Blackheart International titled VIP Infrared Strobe, http://www.bhigear.com/vipinfraredstrobe.aspx dated Oct. 12, 2010 (3 pages).

Website printout from WMJ Marine Boating & Marine Supply titled ACR MS-2000(M) Distress Marker Light 3900, http://www.wmjmarine.com/cms2000m.html dated Oct. 12, 2010 (3 pages).

* cited by examiner

MULTI-FUNCTION EMERGENCY LOCATING AND SENSOR/DETECTION OR WARNING ASSEMBLY SUCH AS ATTACHABLE TO A HELMET OR CLOTHING

CROSS REFERENCE TO RELATED APPLICATIONS

The present application claims the priority of U.S. Ser. No. 61/580,758 filed Dec. 28, 2011.

FIELD OF THE INVENTION

The present application discloses a multi-functional locating/warning/sensing assembly incorporating a number of relative variants. A most basic initial variant incorporates an arrangement of overt and infrared lights for assisting in retrieval such as ideally used in both military and civilian search and rescue applications. Succeeding and upgraded variants include additional features such as a personal recovery beacon feature, shortwave/long wave infrared sensors, and FFI (biological) and EFI (oxygen) sensors. As will be further described throughout the succeeding views, the assembly is constructed of a durable polymeric and waterproof material which exhibits a ductile base material amenable for attaching to such as a helmet, as well as additional variants for clipping, pinning or otherwise securing to an article of clothing through any combination of Velcro, straps, clips, etc. Variants can include combinations of the afore described visible and infrared lights arranged along an exterior of the article, with the integrated beacon recovery features including, without limitation, thermal or infrared detection features such as which can be activated in response to a signal originating from a search and rescue craft (plane, boat, land vehicle, etc.).

BACKGROUND OF THE RELEVANT ART

The prior art is documented with examples of distress and search and recovery devices. Such devices can be secured to or wearable up the helmet or clothing of the user and include such as the S&S Precision Manta Strobe (precision advanced illumination and marking systems), the VIP Infrared Strobe, and the ACR MS-2000(M) Distress Marker Light. Additional examples from the prior art include such as the location recording system of Katz 2008/01784484, the illuminating device and method of Swan 2010/0128470, and the GPS enabled EPIRB with integrated receiver in 2009/0209227.

SUMMARY OF THE PRESENT INVENTION

The present invention is a wearable locating and/or recovery assembly having a body containing a portable battery, an on/off switch communicating the battery with a processor control, and at least one additional switch for actuating, selectively or in combination, at least one overt light and at least one infrared light arranged at discrete locations upon the body. In one variant, the body exhibits a raised and arcuate central battery supporting portion and first and second opposite extending and tapered wings. An over molded underside gripping surface is applied to facilitate mounting the body upon a hard non-linear surface not limited to a helmet.

Additional features include a strap extending from an integral location of the body and engaging an underside location thereof. Hook and loop fasteners can be associated with the strap and underside location.

In one non-limiting variant, at least one pair of each of overt and infrared lights can be located on upper surfaces of the wings. A personal recovery beacon feature can also be integrated into the device and communicated with the battery, such as activated by a separate switch.

Additional features of the recovery beacon further include the provision of thermal sensor capabilities. At least one shortwave infrared light can be communicated via a control module and switch with the battery. At least one long wave infrared can also be communicated via a control module and switch with the battery in parallel with the shortwave light.

Other features include provision of at least one FFI sensor capable of detecting any one or more of a chemical, atomic, or toxic compound. Additionally contemplated are at least one EFI sensor for evaluating surrounding oxygen conditions.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

As previously described, the present application discloses several variations or gradations of a multi-functional locating/warning/sensing assembly, such as for use by both military and civilian (e.g. fire/marine rescue). As will be described throughout the succeeding illustrations, a basic (or floor) variant (see assembly 10 generally identified in FIG. 1) provides a typically ergonomically configured body having a suitable configuration with a central most and arcuate three dimensional body 12 with flared sides or wings 14 and 16 (such as for mounting to a helmet as depicted in the non-limited illustrations provided herein and represented in succeeding illustrations FIGS. 32-37.

The body is constructed of a durable polymeric and waterproof material which exhibits a ductile base material (such as including the extending and tapering undersides of the wings 14 and 16), and which is amenable for attaching to such as the helmet shown in FIGS. 32, 33, 36 and 37. Although not shown, additional variants contemplate any of clipping, pinning or otherwise securing of the assembly (such as but not limited to the design depicted above) to an article of clothing through any combination of Velcro, straps, clips, etc.

As will be further described, other variants of the assembly can include combinations of the afore described visible and infrared lights arranged along an exterior of the article, with the integrated beacon recovery features including, without limitation, thermal or infrared detection features such as which can be activated in response to a signal originating from a search and rescue craft (plane, boat, land vehicle, etc.). The above, in combination with the arrangement of overt and infrared lights, assist in personnel retrieval such as ideally used in both military and civilian search and rescue applications.

As will be further described in the succeeding and upgraded variants, additional features such as a personal recovery beacon, shortwave/long wave infrared sensors, and FFI (biological) and EFI (oxygen) sensors can be integrated into the assembly package in order to provide any combination of functionality based upon the desired application. By non-limiting example, certain features such as the varied types of IR (infrared) lights depicted, may be more specific to military applications where a consideration is in locating lost personnel without unnecessarily revealing their position to enemy forces, whereas more visible type locating features (strobes, beacons, etc.) may be more applicable to civilian search and rescue operations where enemy avoidance is not a concern.

Figure 1:
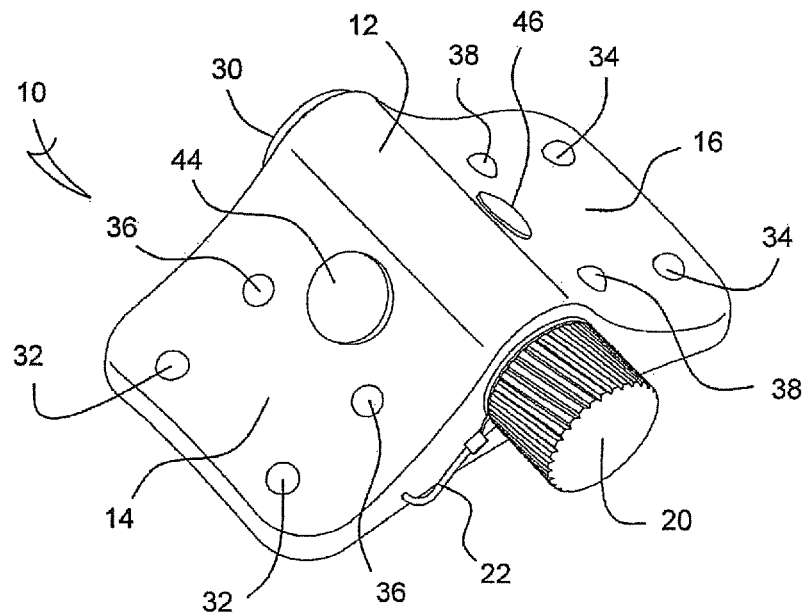
FIG. 1 is a perspective view of the emergency locating assembly according to one non-limiting embodiment of the present inventions.
Figure 2:
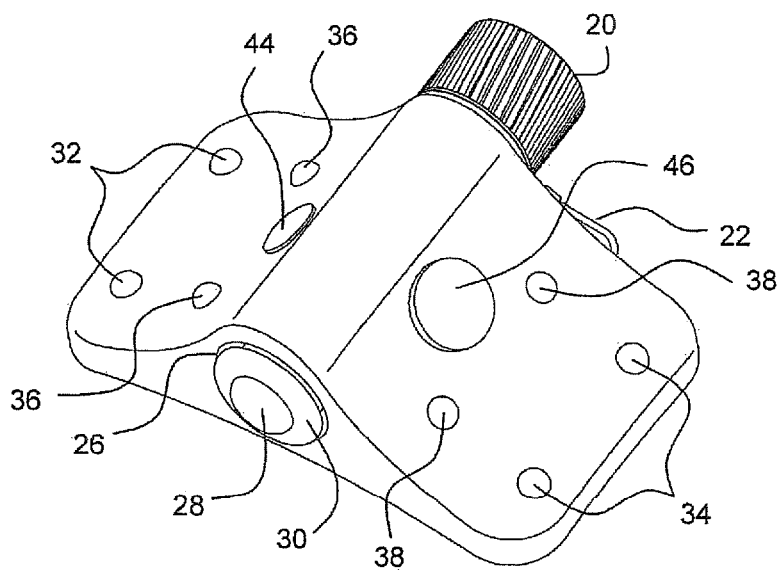
FIG. 2 is a further rotated perspective view of the assembly of FIG. 1.
Figure 13:
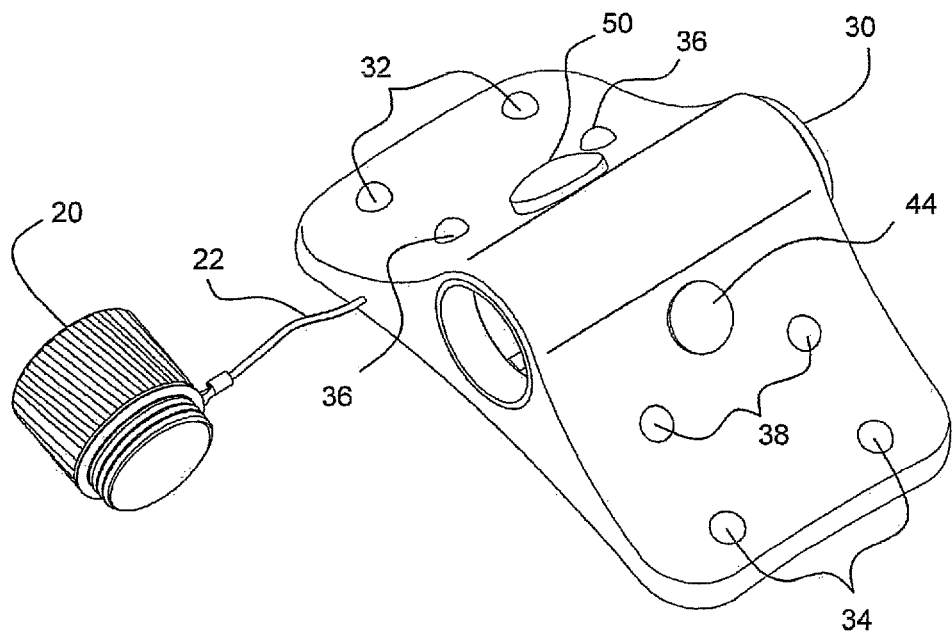
FIG. 13 is a partially exploded view illustrating the battery cap removed from the main assembly body and suspended from the cap tether.

Referring now to FIG. 1, a perspective view is again depicted at 10 of the emergency locating assembly according to one non-limiting embodiment of the present inventions. As previously described, the body can exhibit any desired configuration and, with reference to that depicted, is configured with an arcuate and sleek profile upper surface exhibiting a substantial bat shape with the central body 12 being substantially cylindrical shaped with an open interior (see FIG. 13) suitable for seating a battery (see alkaline style battery shown at 18 in FIG. 3) which seats within an interior cylindrical recess defined in the central body.

Figure 3:
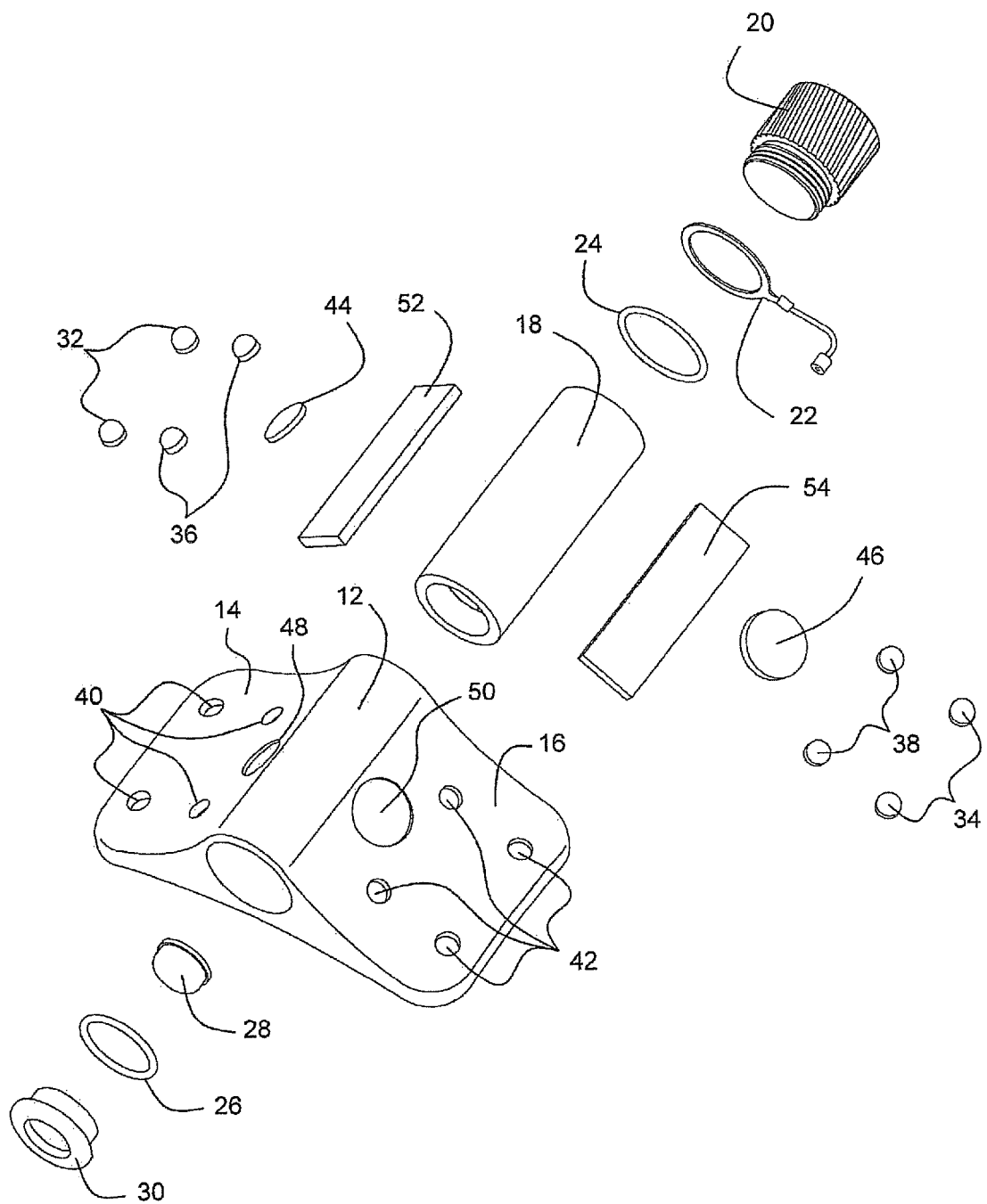
FIG. 3 is an exploded view of the assembly and illustrating internal components such as the battery and processor supporting circuit boards for operating the various IR and visible light displays.
Figure 4:
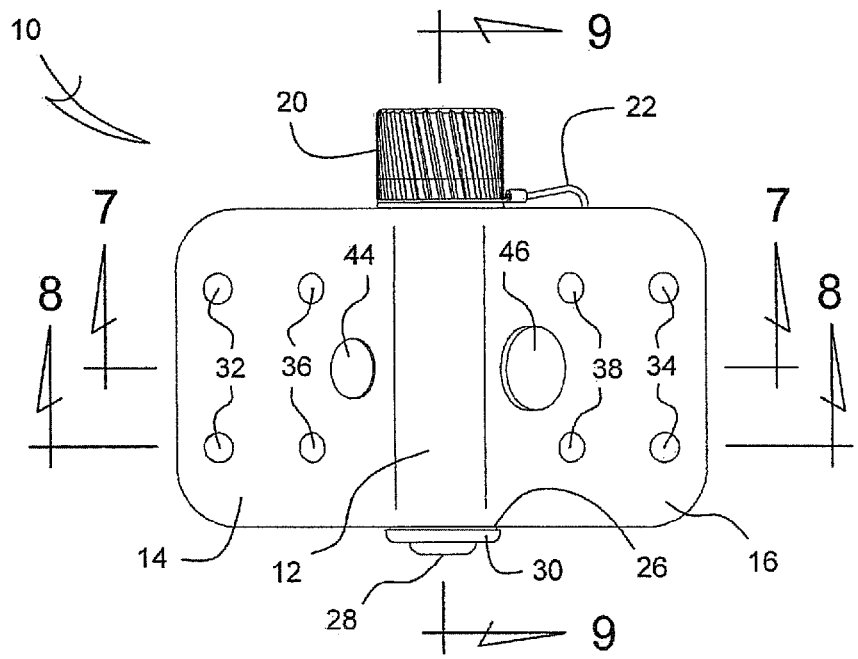
FIG. 4 is a top assembly view of the assembly.
Figure 5:
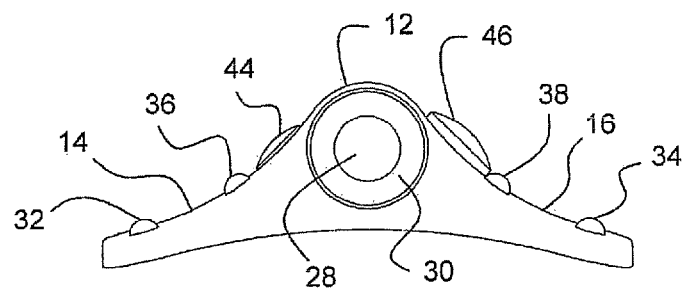
FIG. 5 is a first end view.
Figure 6:
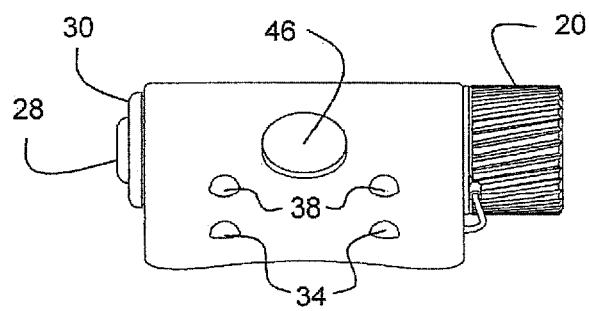
FIG. 6 is a side view.
Figure 7:
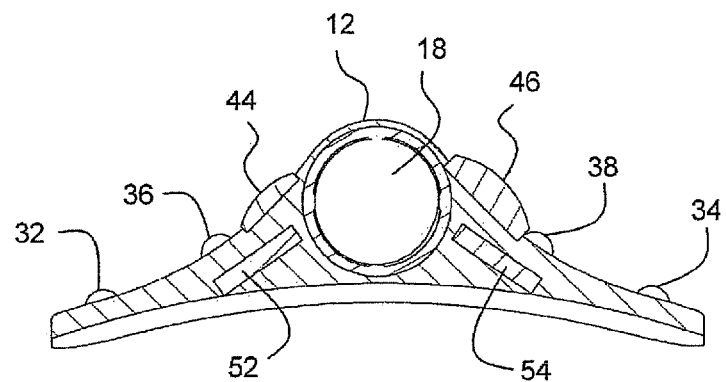
FIG. 7 is a cutaway view taken along line 7-7 of FIG. 4.
Figure 8:
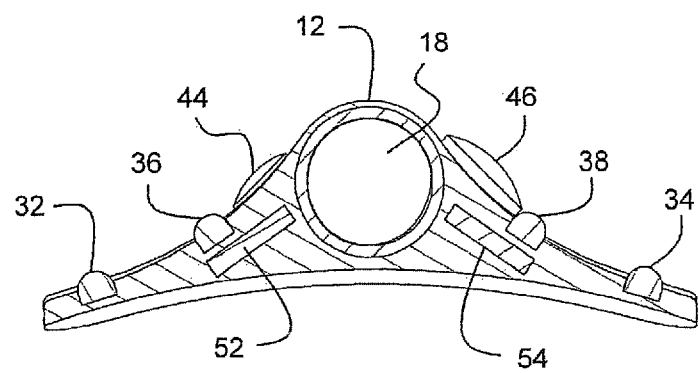
FIG. 8 is a cutaway view taken along line 8-8 of FIG. 4.
Figure 9:
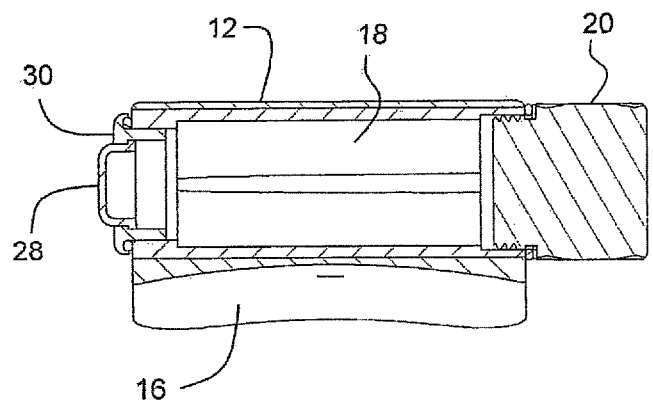
FIG. 9 is a cutaway view taken along line 9-9 of FIG. 4.

As further shown in FIG. 3, the battery 18 is held within the central body 12 by a screw cap 20 held in place by a cap tether 22 extending from a mounting location of the body 12 (FIG. 13) and biasing an O-ring 24 in order to provide a water tight seal over the battery compartment when screwed into place. An on/off switch is configured on an opposite end of the central body 12 and includes a second identical O-ring 26 seating against an end face of the central body 12 opposite that of the first O-ring 24 and through which projects an ON/Off button 28, held in place by a button retainer 30 including an inner annular projection seating within the cylindrical recess and so that the inside end face of the retainer 30 biases the O-ring 26 against the central body 12 in likewise water tight fashion.

As is further depicted throughout FIGS. 1-14, the initial variant includes an arrangement of lighting elements incorporated into upper exhibiting faces of the wings 14 and 16, these including outer pairs of overt lights 32 and 34 (such as LED elements or the like), combined with inner pairs of infrared lights 36 and 38. Each of the four pairs of lights depicted seat within individual pluralities of aperture locations 40 and 42 arranged at locations associated with the upper faces of the wings 14 and 16 (see again FIG. 3).

Additional features include push buttons 44 and 46 which seat within additional configured recesses 48 and 50 positioned at inward locations of the wings 14 and 16 proximate the raised central body 12. Finally, a pair of processor supporting circuit boards or cards are depicted at 52 and 54 and which are installed within the interior of the body 10 such that they provide selective or combination activation of the overt and/or infrared pairs of lights, such as which can be associated with a two position arrangement incorporated within the ON/OFF switch 28.

Figure 10:
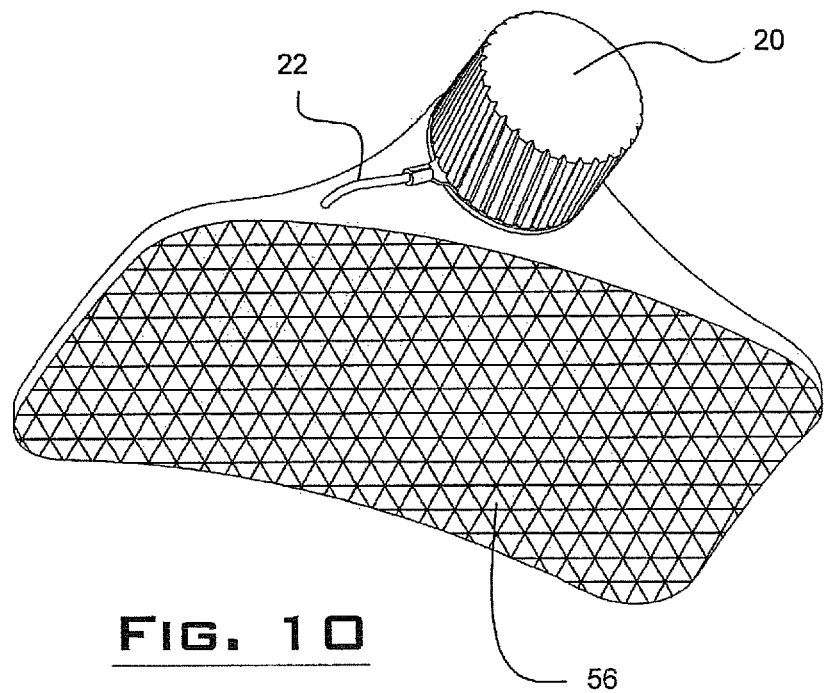
FIG. 10 is an underside perspective of the assembly and depicting one variation of a an underside exhibiting either of a tactile or releasably engageable surface and being configured for conforming to a mounting surface.
Figure 11:
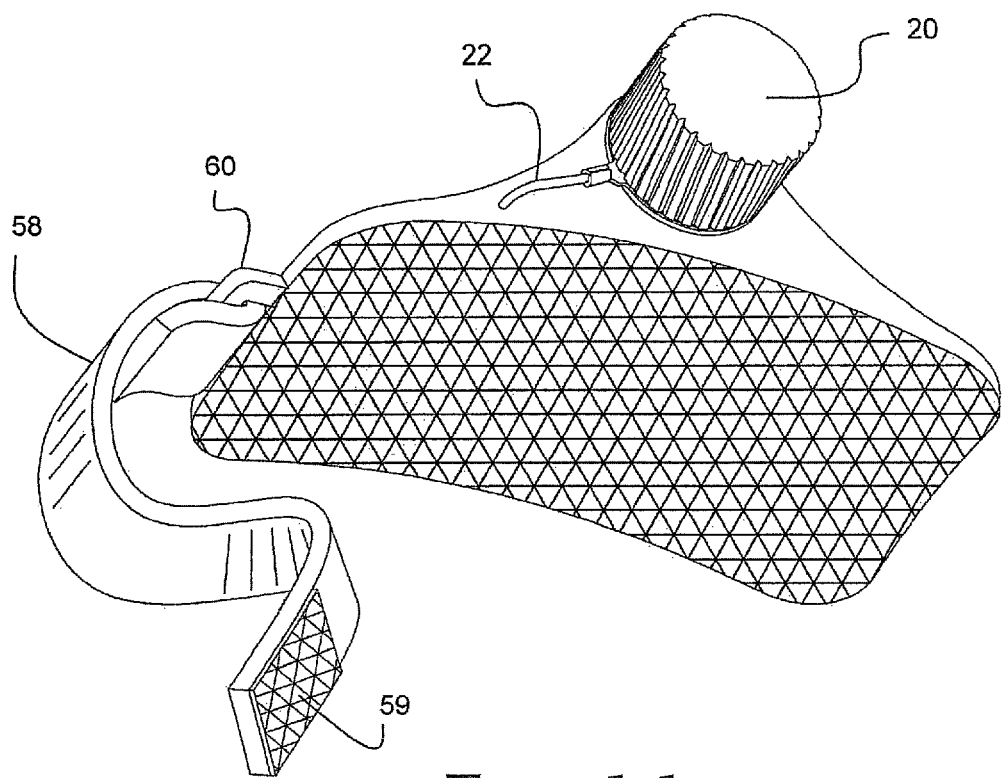
FIG. 11 is a variation of FIG. 10 and further illustrating an attachable loop with optional hook and loop fasteners extending from an integral mounting location associated with a connecting edge portion of the assembly base.
Figure 12:
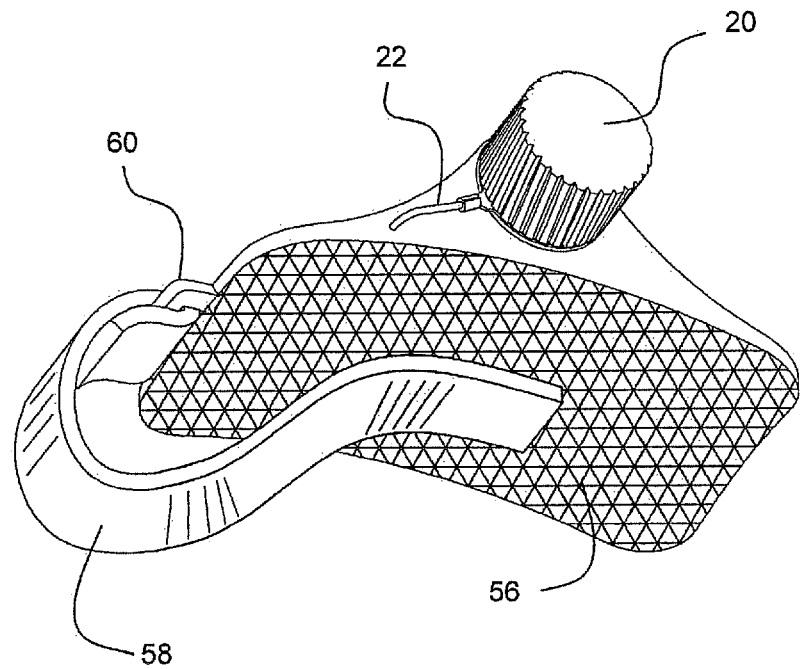
FIG. 12 is a succeeding view to FIG. 11 and depicting the loop portion attached to the underside of the assembly body.
Figure 14:
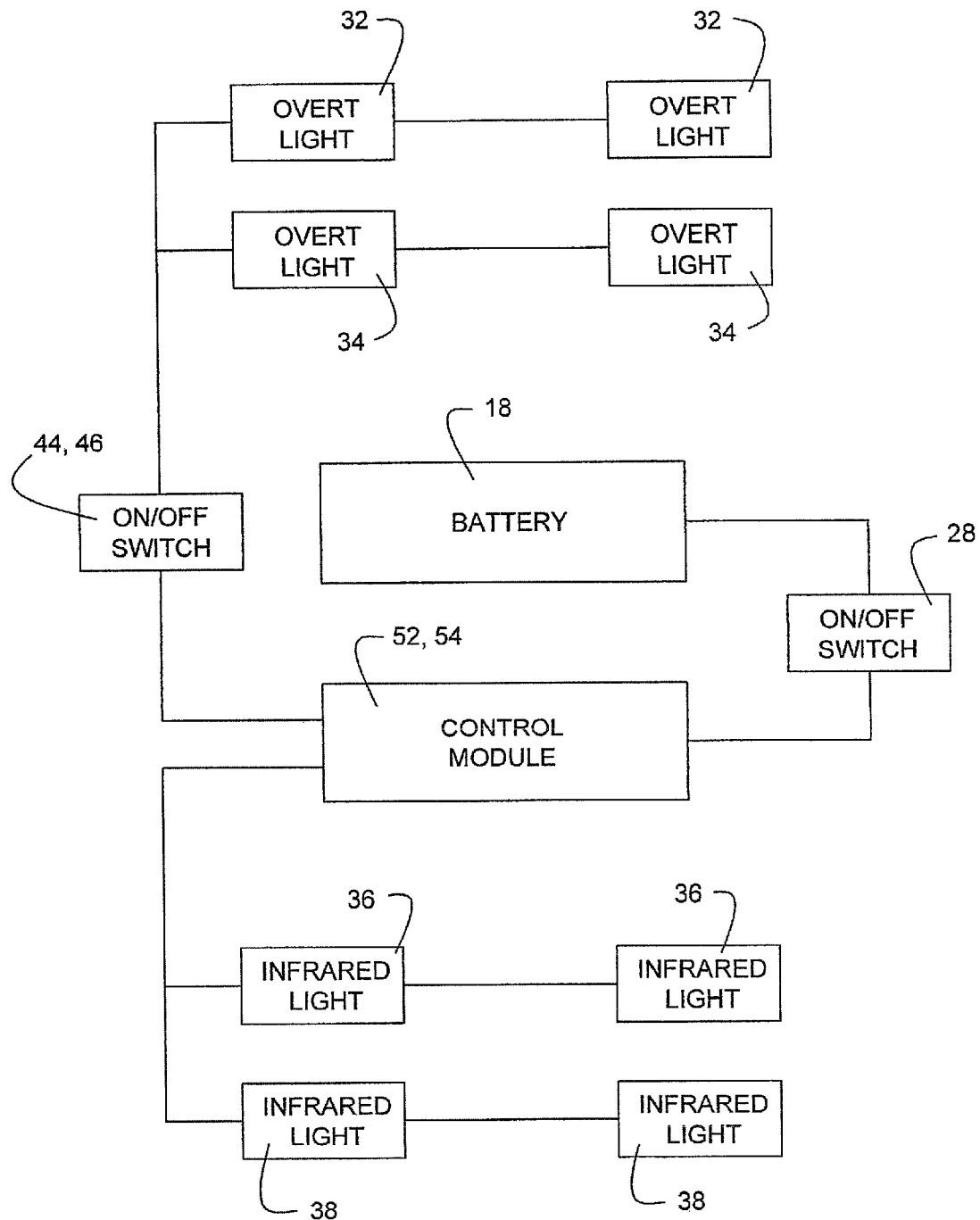
FIG. 14 is a first diagram illustrating the various assembly components such as illustrated in FIG. 1.

While not shown, it is understood that a suitable wiring hierarchy or interior architecture is integrated into the assembly to facilitate its operation, including actuation of the overt and infrared light pairs, individually or in tandem (further reference is made to the wiring diagram of FIG. 14 which identifies in schematic fashion the various components most broadly depicted in the exploded view of FIG. 3). Further shown in FIG. 10 is an underside perspective of the assembly and depicting one variation of an underside exhibiting either of a tactile or releasably engageable surface 56 and being configured for conforming to a mounting surface. FIG. 11 is a variation of FIG. 10 and further illustrating an attachable loop 58 with optional hook and loop fasteners 59 (e.g. Velcro) extending from an integral mounting location (see eyelet 60) associated with a connecting edge portion of the assembly base and which can attach to an additional hook and loop fastener portion (not shown) at any suitable location associated with the device, the wearer's helmet, or any other location such as associated with the wearer's clothing. FIG. 12 is a succeeding view to FIG. 11 and depicting the loop portion 59 attached to the underside of the assembly body in one non-limiting application.

Figure 15:
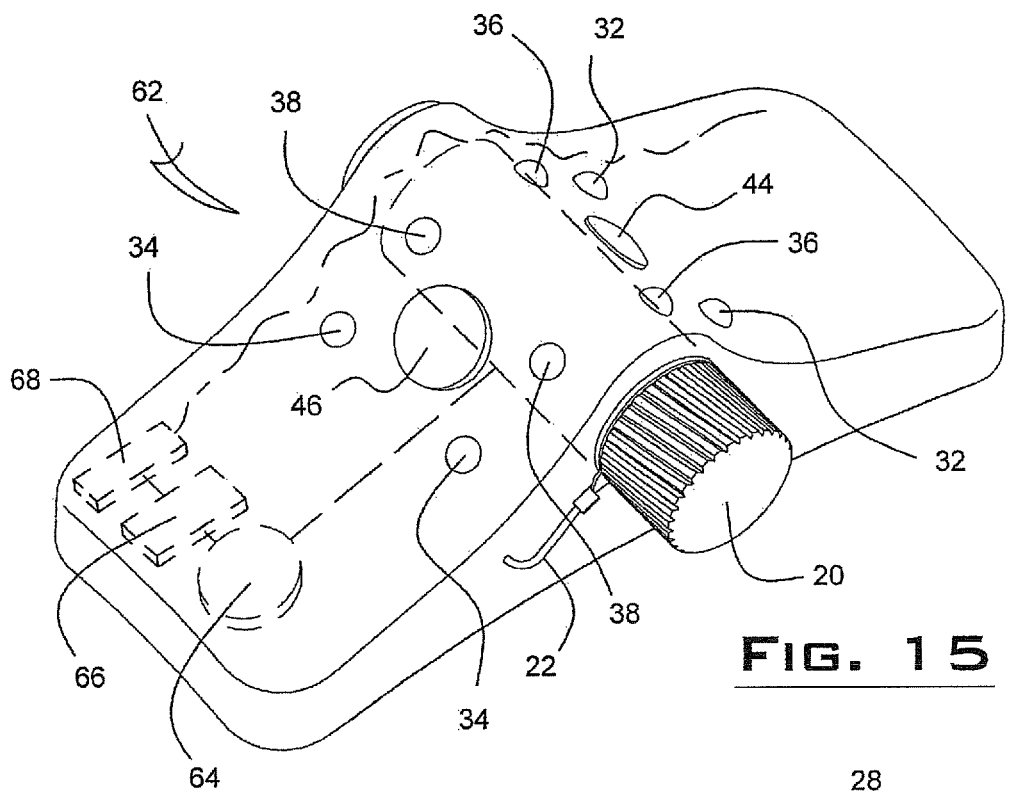
FIG. 15 is an assembly view similar to FIG. 1 and illustrating a modified variant of the assembly including, in interior phantom representation, both rechargeable battery and personal recovery beacon features.
Figure 16:
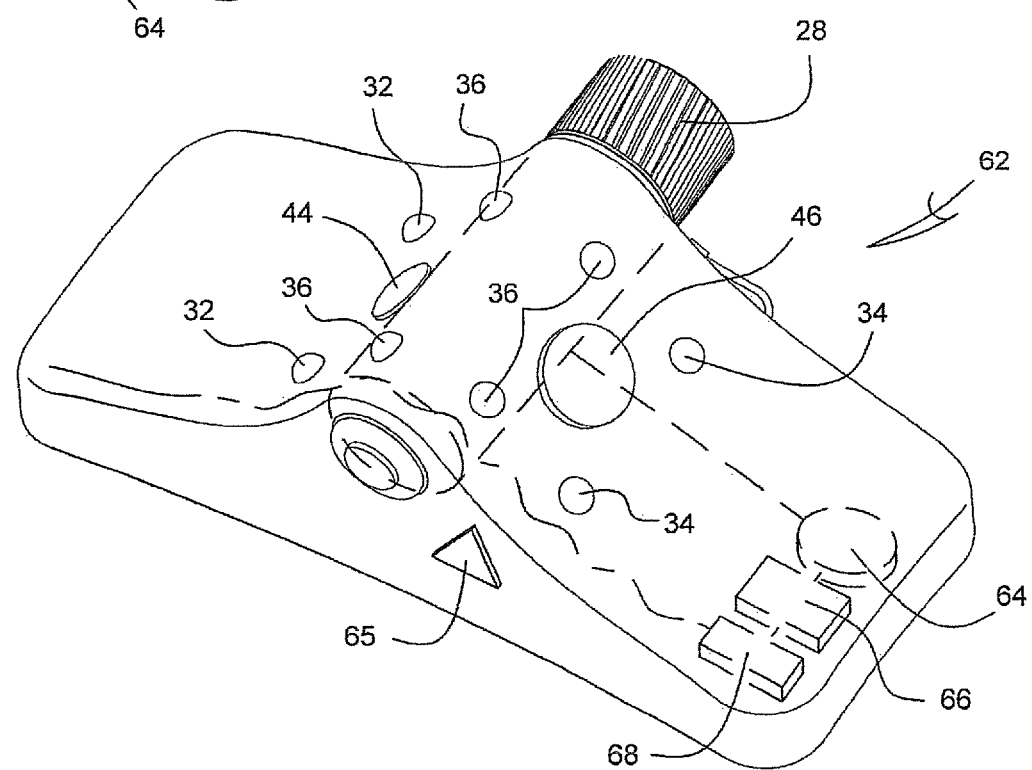
FIG. 16 is a rotated perspective of the assembly in FIG. 15.
Figure 17:
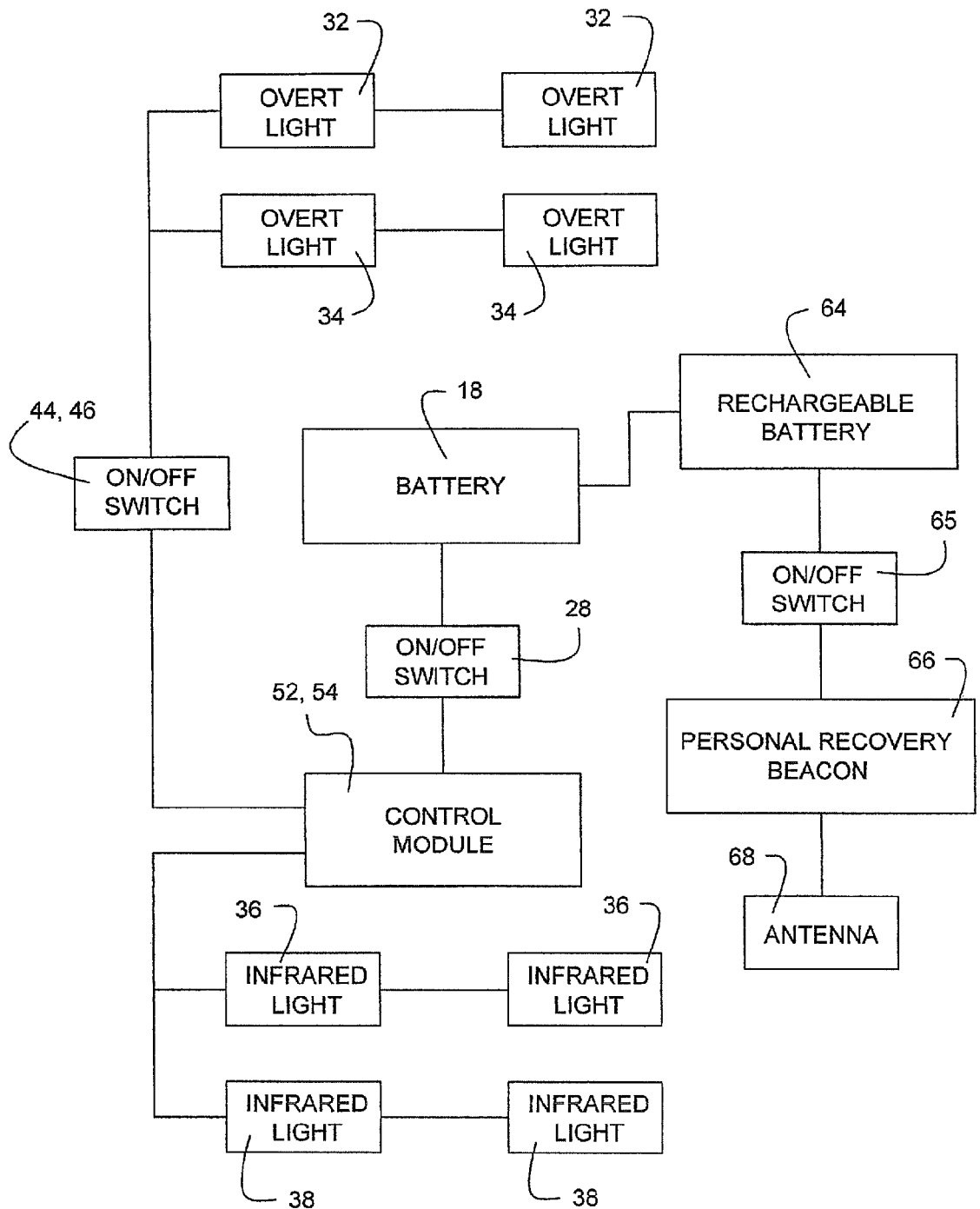
FIG. 17 is a modified second diagram compared to that shown in FIG. 14 and illustrating the rechargeable battery feature in combination with a personal recovery beacon component associated with the variant of FIGS. 15-16.

FIGS. 15-17 illustrate a first modified assembly, at 62, similar to FIG. 1 and which represents substantially all of the same functionality as provided in the initial variant such that all identical features previously referenced in FIGS. 1-14 are not repetitively described (it being further understood that the pairs of infrared and overt lights illustrated in FIGS. 15-16 are moved inward towards the central body as also previously depicted at 32, 34, 36 and 38 in FIG. 1. As is further shown, each of the package assemblies depicted in the succeeding embodiments include a somewhat larger assembly of similar shape to that depicted at 10 in FIG. 1, such as in order to integrate the additional functional components. The schematic of FIG. 17, in comparison to the initial variant schematic of FIG. 14, the second variant 62 additionally includes, in interior phantom representation, both a rechargeable battery 64 with additional ON/OFF switch 65 and personal recovery beacon 66 feature. As is further shown, the beacon includes a separate antenna 68 to maximize reception and, when actuated, is processor driven in order to either emit a search and rescue recovery signal and/or to respond to an output signal from a vehicle (plane, boat, land vehicle, etc) in order to assist the location and retrieval of the individual.

Figure 18:
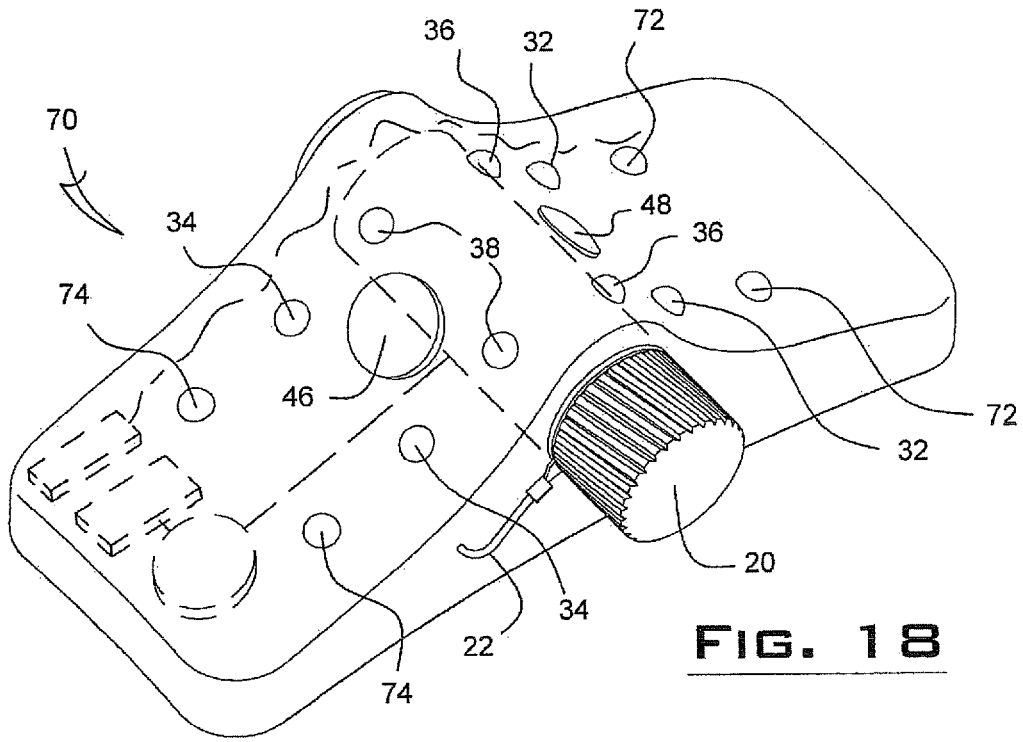
FIGS. 18 and 19 are successive assembly perspectives similar to that depicted in FIGS. 15-16 and illustrating a further modified variant based on the design of FIGS. 15-17 and additionally including a pair of shortwave infrared light features.
Figure 19:
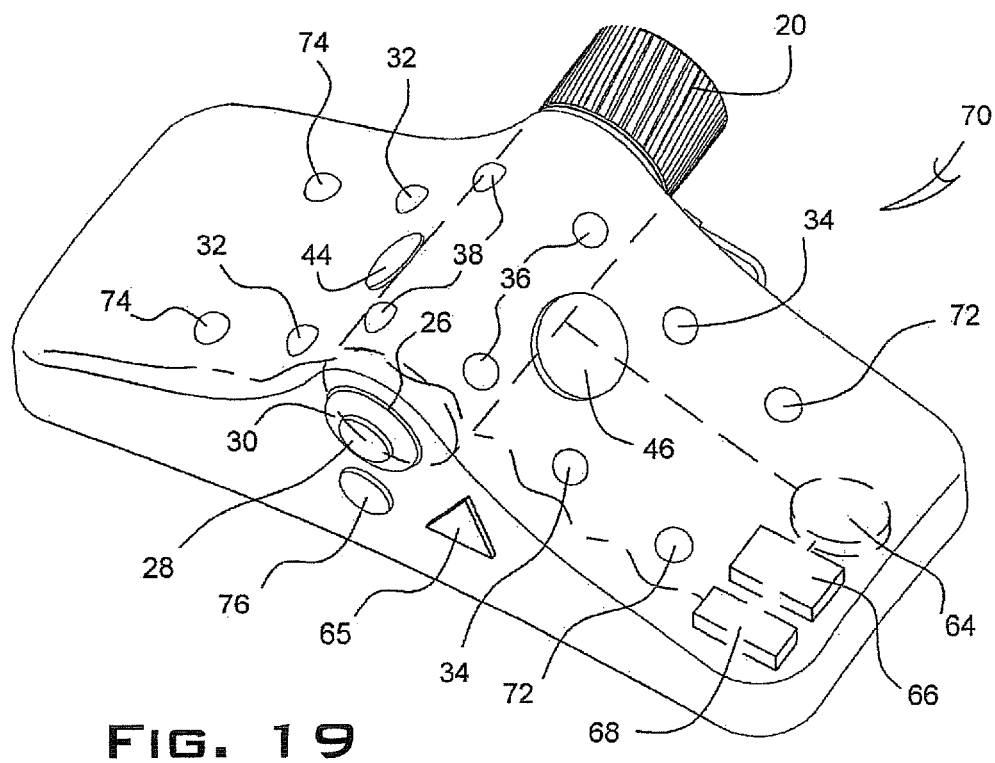
Figure 20:
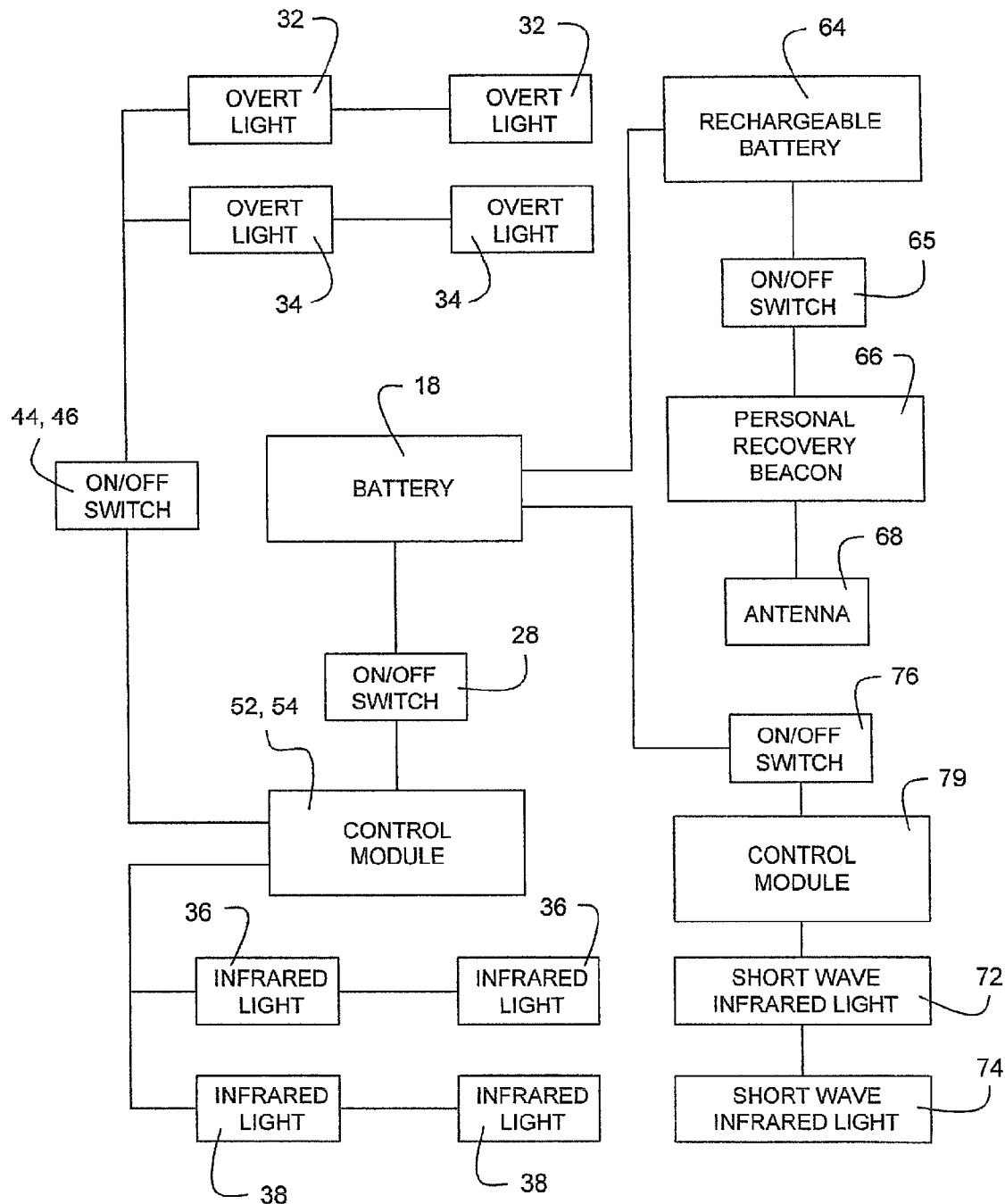
FIG. 20 illustrates a third diagram of the features corresponding to FIGS. 18-19.

Proceeding to FIGS. 18-20, further depicted in succession assembly perspective and associated diagrammatic views of a further variant, at 70, which is similar to that depicted in FIGS. 15-16 and additionally including one or more pairs of shortwave infrared lights 72 and 74 supplied by a separate ON/Off switch 76 and communicated with the battery via a further dedicated control module 79 (see FIG. 20).

Figure 21:
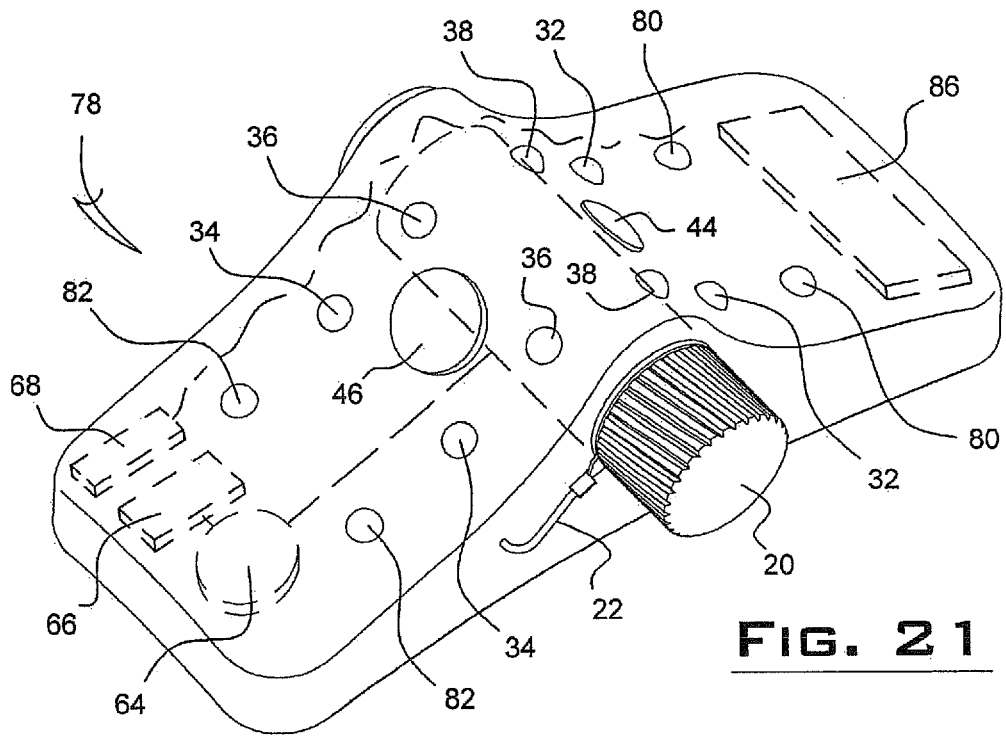
FIGS. 21 and 22 are successive assembly perspectives of a fourth variant based on the design of FIGS. 18-20 and including both short and long wave infrared wave light features.
Figure 22:
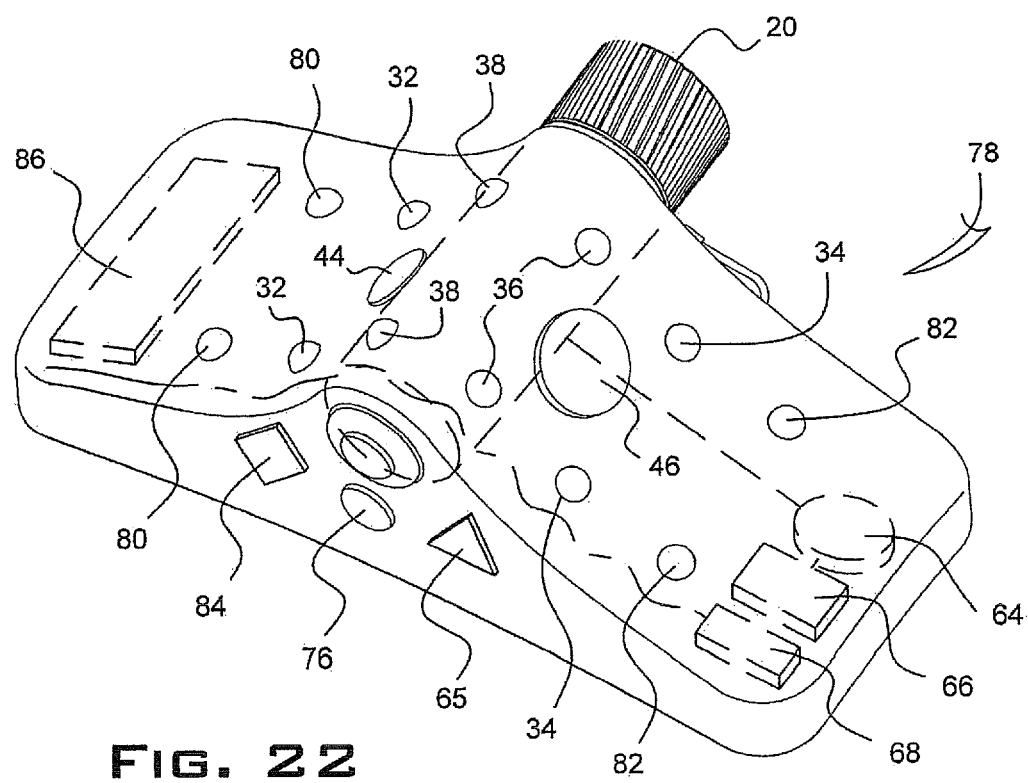
Figure 23:
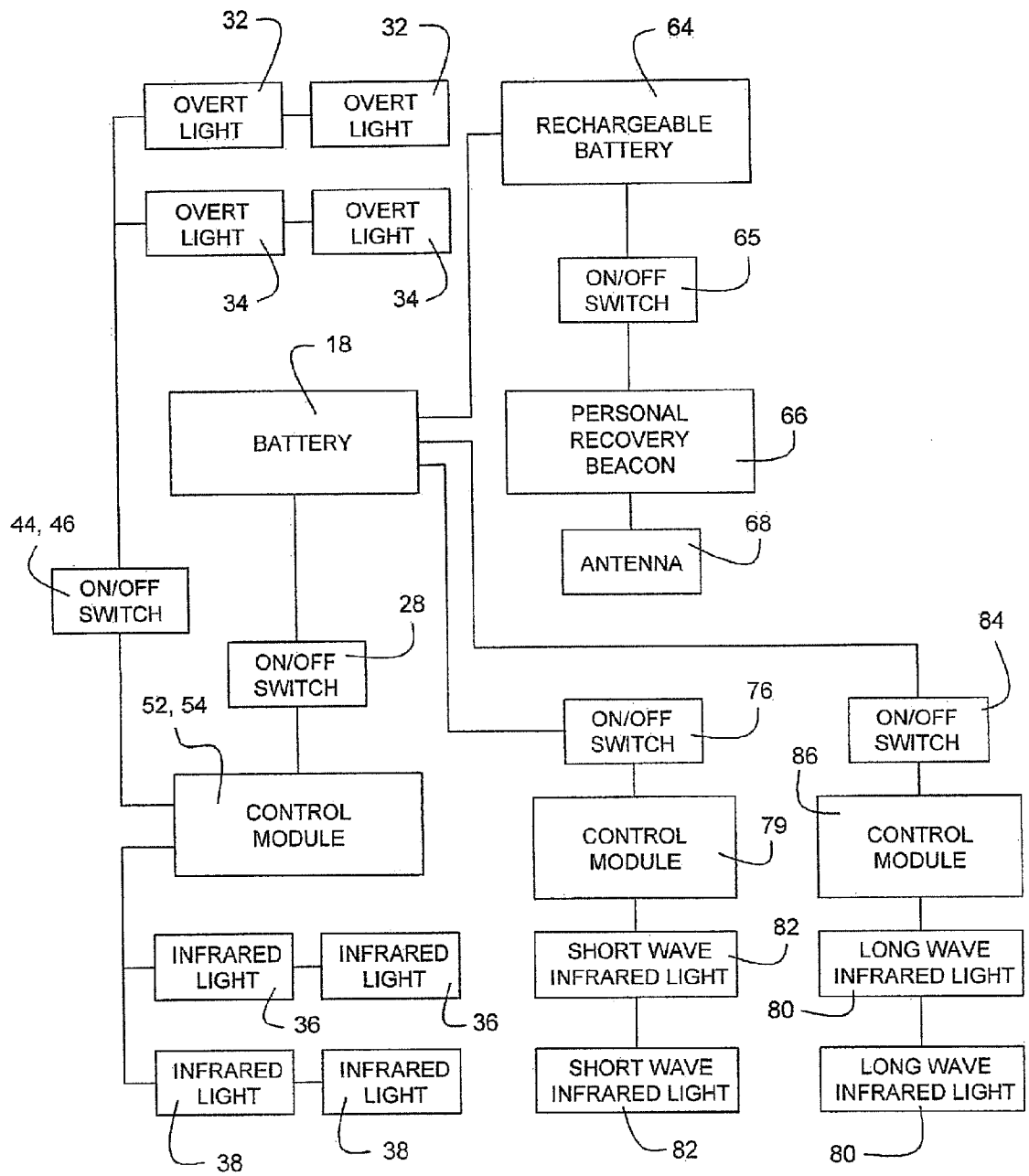
FIG. 23 is a fourth diagram of the features corresponding to FIGS. 21-22.

FIGS. 21-23 collectively depict a further variant (at 78 in FIGS. 20 and 21) based on that shown at 70 and adding long wave infrared lights, depicted by pair of lights 80 arranged opposite additional shortwave infrared lights 82. A further ON/OFF switch 84 triggers activation of the long wave lights 80 (the preceding depicted switch 76 activating the shortwave infrared lights both in the preceding variant and again at 82). A further control module 86 is further depicted in phantom in FIGS. 21-22 and controls operation of the long wave infrared lights 80 in communication with the central battery 18.

Figure 24:
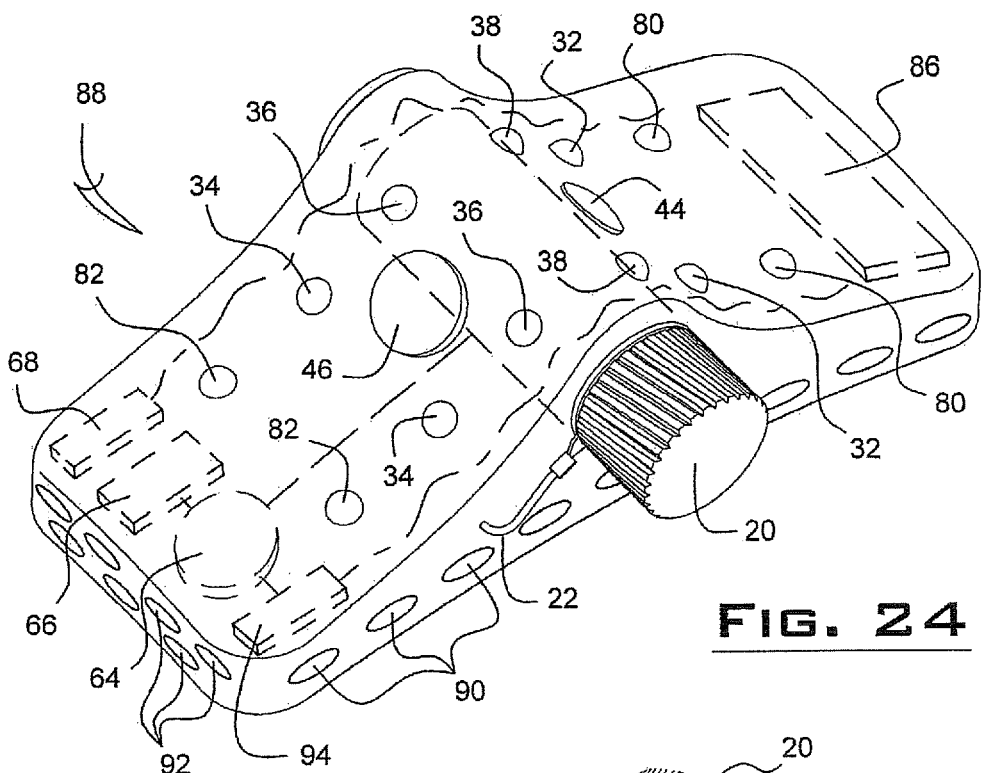
FIGS. 24 and 25 are successive assembly perspectives of a fifth variant based on the design of FIGS. 21-23 and adding to the previously described rechargeable battery feature both FFI (biological warfare) and EFI (oxygen) sensors.
Figure 25:
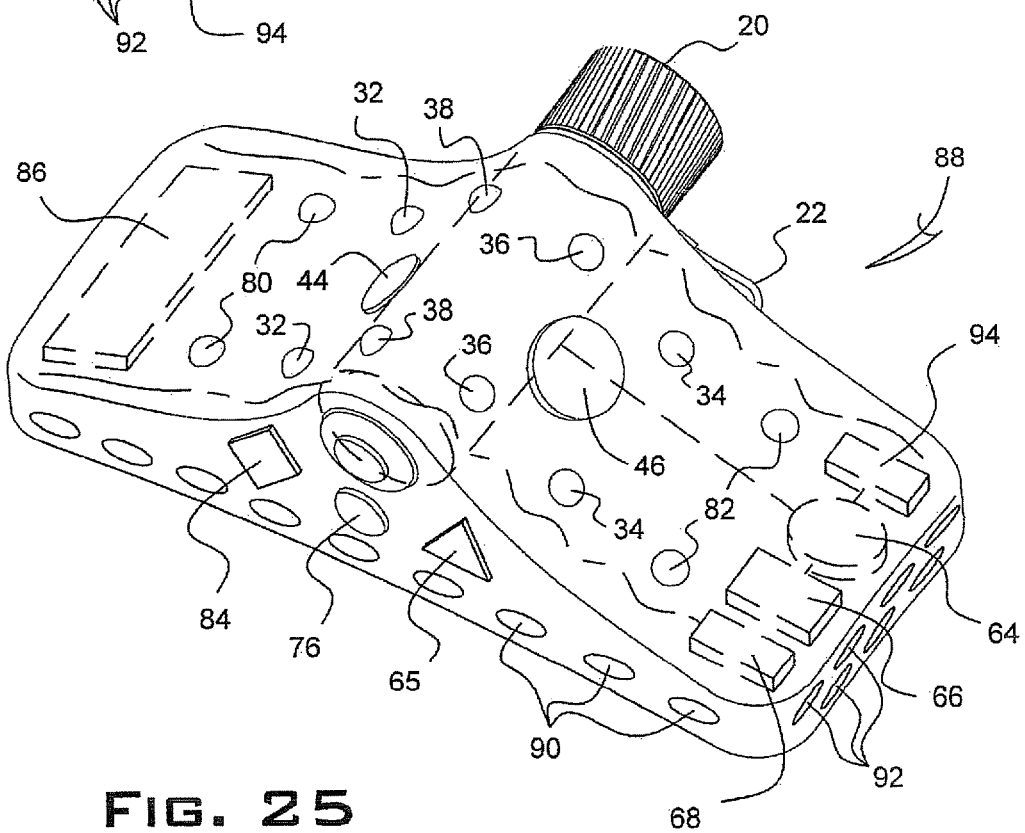
Figure 26:
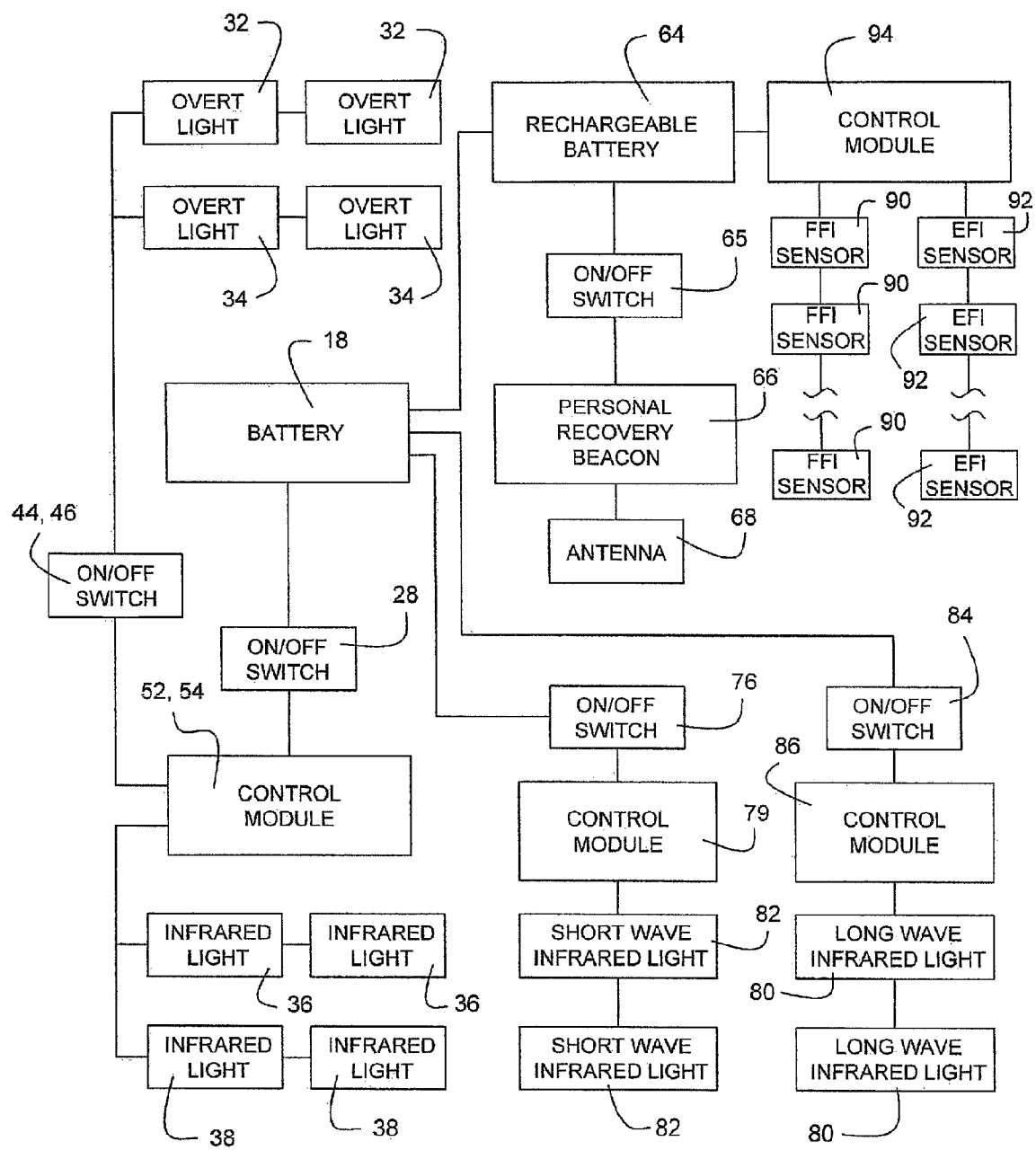
FIG. 26 is a fifth diagram of the features corresponding to FIGS. 23-25.

FIGS. 24 and 25 are successive assembly perspectives 88 of a fifth variant based on the design of FIGS. 21-23 and adding to the previously described rechargeable battery feature both FFI (biological warfare) 90 and EFI (oxygen) 92 evaluation sensors, both controlled by a further control module 94 mounted within the assembly package. As is further known, such biological warfare conditions can include any one or more of chemical, atomic and/or toxic compounds. FIG. 26 is a fifth diagram of the features corresponding to FIGS. 23-25 and aggregating all of the previously described features in addition to the FFI and EFI sensor functionality.

Figure 27:
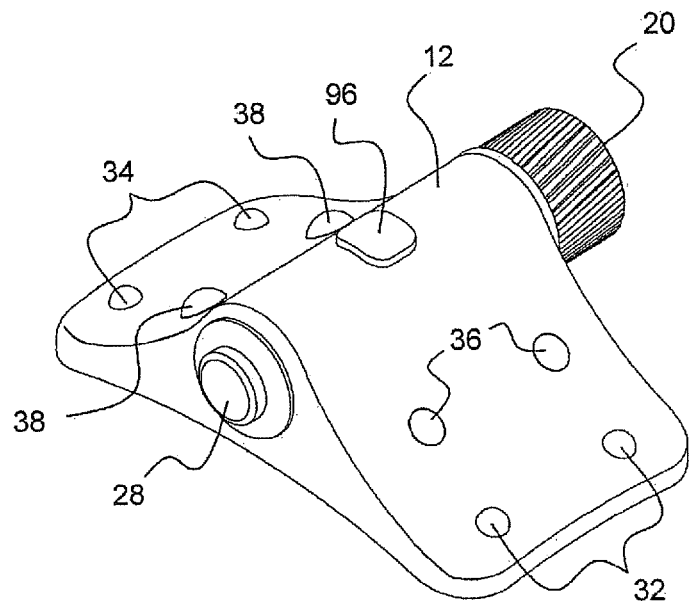
FIG. 27 is a perspective view of a further variant of a wearable emergency locating device exhibiting a top located sensor in addition to the wing arrayed patterns of overt and IR lights.
Figure 28:
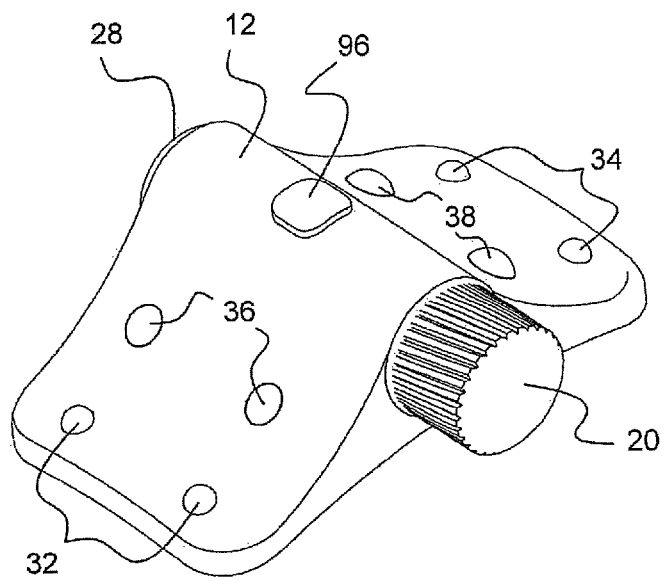
FIG. 28 is a rotated perspective view of the device of FIG. 27.
Figure 29:
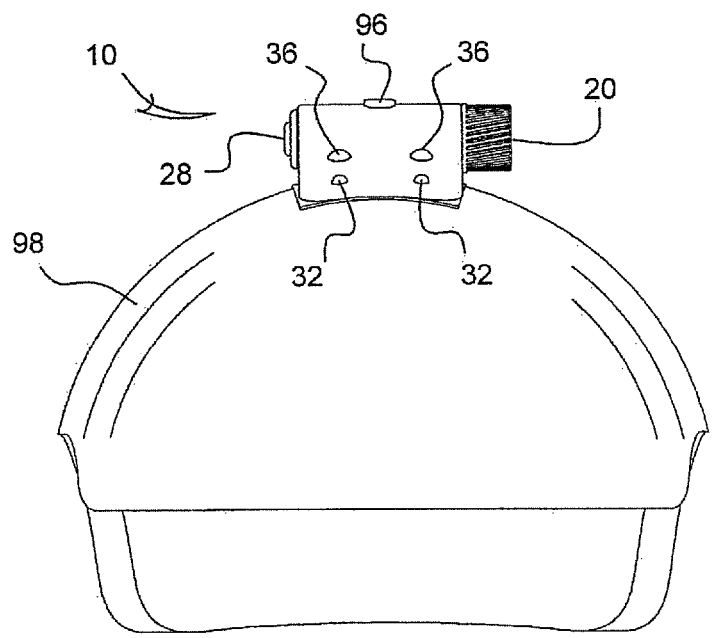
FIGS. 29-32 illustrate a succession of end, top, perspective and side views of the device of FIG. 27 mounted atop a helmet.
Figure 30:
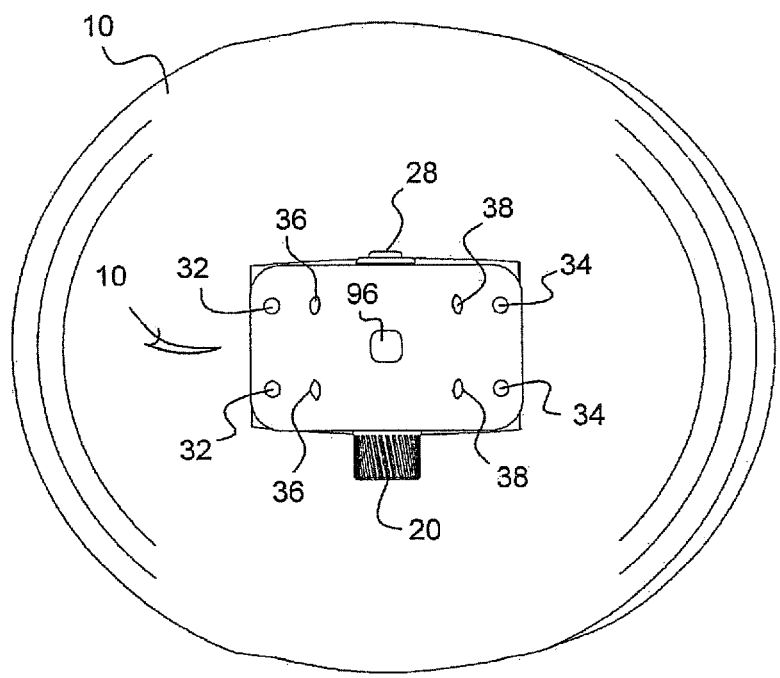
Figure 31:
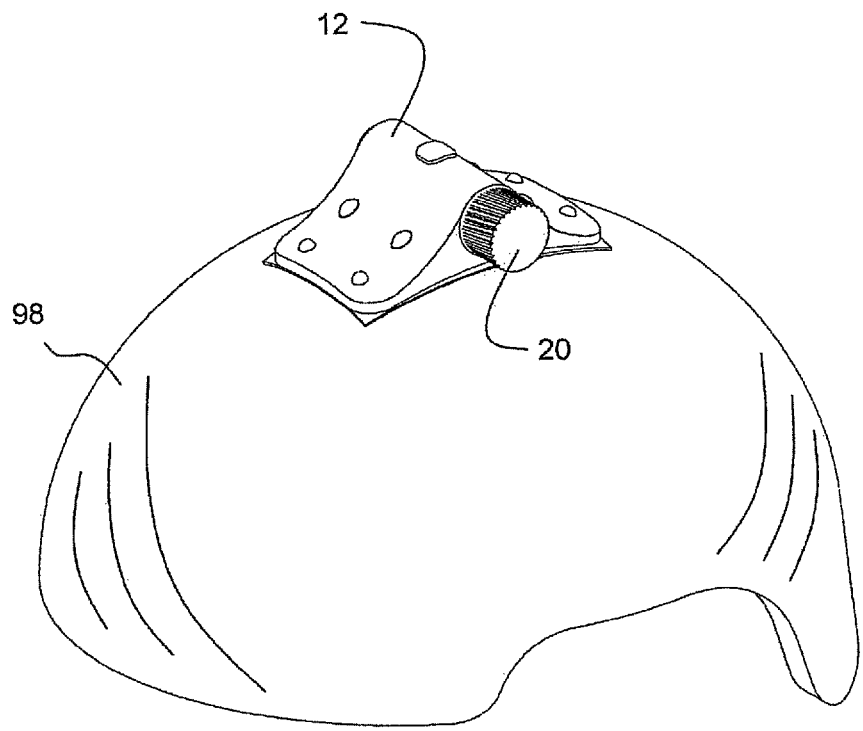
Figure 32:
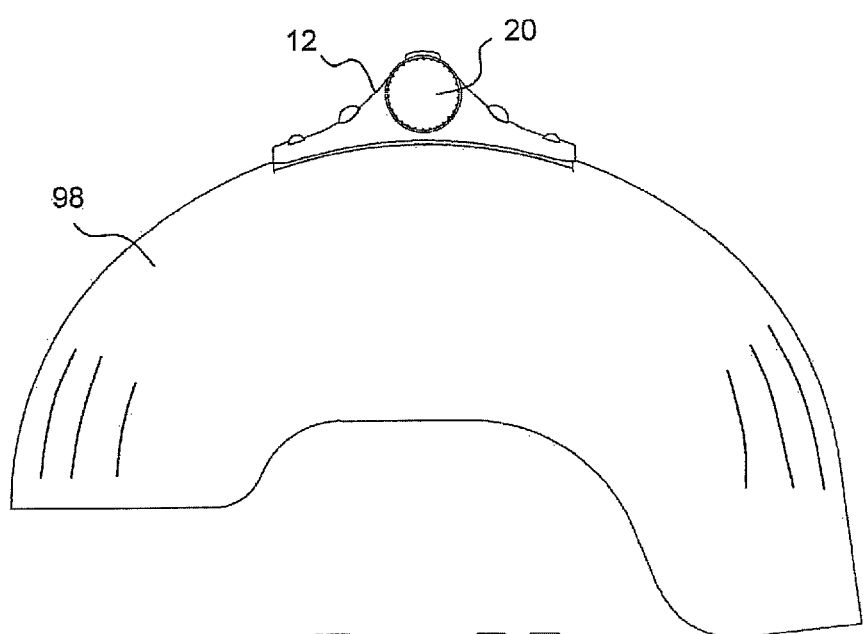

FIGS. 27 and 28 are a pair of perspective views of a further variant of a wearable emergency locating device substantially as originally described in FIG. 1 and further exhibiting a top located sensor 96 in addition to the wing arrayed patterns of overt 32, 34 and IR 36, 38 lights. The top located sensor 96 can be of any desired variety selected from, but not limited to, those previously described. Additional FIGS. 29-32 illustrate a succession of end, top, perspective and side views of the device of FIG. 27 mounted atop a helmet 98 according to one non-limiting construction.

As previously described, a further thermal intermittent beacon feature can be integrated into the package assembly such as depicted in FIGS. 15-17. It is also envisioned that a variety of attachment configurations can be employed, such as again including Velcro (hook and loop fasteners) or other engagement portions for assisting in engaging the device to the wearer. The underside of the assembly base can again include a pliable over molded material to facilitate securing in a tactile/anti skid fashion further to such as a helmet or other rigid and/or arcuate surface.

Having described our invention, other and additional preferred embodiments will become apparent to those skilled in the art to which it pertains, without deviating from the scope of the appended claims.

We claim:

1. A multi-functional wearable locating and/or recovery assembly, comprising:
    a raised and arcuate central body containing a portable battery accessible upon removing a screw cap releasably secured to an end surface of said body, a pair of tapered wings integrally extending from opposite edges of said central body, each of said wings exhibiting an upper face and terminating in narrow-most outer edges;
    an underside of said body configured for conforming to a mounting surface, said underside of said body further including a sloping and over molded underside gripping surface for facilitating mounting upon a hard non-linear surface not limited to a helmet;
    an on/off switch communicating said battery with a processor control incorporated into said body;
    at least one pair each of overt lights and at least one pair of infrared lights, said pairs of overt and infrared lights each being located on upper surfaces of said outwardly tapered wings;
    a personal recovery beacon feature communicated with said battery and activated by a separate switch;
    and said personal recovery beacon feature operating with activation of said overt pair of lights in a first general search and recovery operation and, separately, with selective activation of said infrared lights in a second search and recovery operation.

2. The assembly as described in claim 1, further comprising a strap extending from an integral location of said body and engaging an underside location of said body.

3. The assembly as described in claim 2, further comprising hook and loop fasteners associated with said strap and underside location.

4. The assembly as described in claim 1, said recovery beacon further comprising thermal sensor capabilities.

5. The assembly as described in claim 1, further comprising at least one shortwave infrared light communicated via a control module and switch with said battery.

6. The assembly as described in claim 5, further comprising at least one long wave infrared communicated via a control module and switch with said battery in parallel with said shortwave light.

7. The assembly as described in claim 1, further comprising at least one FFI sensor capable of detecting any one or more of a chemical, atomic, or toxic compound.

8. The assembly as described in claim 1, further comprising at least one EFI sensor for evaluating surrounding oxygen conditions.

* * * * *